United States Patent [19]

Betterton et al.

[11] Patent Number: 4,753,561

[45] Date of Patent: Jun. 28, 1988

[54] SELF-LOCKING RESILIENT PANEL ANCHOR

[75] Inventors: Joseph T. Betterton, Arab; Alfred H. Glover, Decatur, both of Ala.

[73] Assignee: Chrysler Motors Corporation, Highland Park, Mich.

[21] Appl. No.: 45,334

[22] Filed: May 4, 1987

[51] Int. Cl.$^4$ .............................................. F16B 37/04
[52] U.S. Cl. ..................... 411/182; 411/173; 403/407.1
[58] Field of Search ............... 411/103, 104, 111, 112, 411/173, 174, 175, 182, 60, 61, 437, 908, 970; 403/406.1, 407.1, 405.1; 52/787, 582

[56] References Cited

U.S. PATENT DOCUMENTS 3,527,280  9/1970  MacNorius ..................... 411/182
3,967,432  7/1976  Starr ............................. 411/970

Primary Examiner—Neill Wilson
Attorney, Agent, or Firm—Edward P. Barthel

[57] ABSTRACT

A molded one-piece elastomeric anchor member for securing and apertured workpiece to a mating edge of a normally extending panel by means of a fastener. The anchor member has an elongated body comprising a pair of opposed arcuate wall portions defining a central bore for receiving a threaded shank of the fastener. The arcuate wall portions are interrupted by a pair of diametrically opposed living hinge gaps bridged by an arcuate web portion and a wedge-shaped portion, respectively. A cut-out, formed in the panel mating edge, is adapted to receive the anchor member therein. A flange section extends from each juncture of the web portion with the body so as to contact one side of the panel. The wedge-shaped portion defines a pair of cam shoulders adapted to snap outwardly and lock the anchor member in the cut-out after being manually compressed about its living hinges during insertion in the cut-out. Upon the threaded shank being inserted through the workpiece aperture and threaded in the central bore the anchor member is mechanically locked in the panel cut-out while the workpiece is secured to the panel mating edge.

6 Claims, 1 Drawing Sheet

SELF-LOCKING RESILIENT PANEL ANCHOR

BACKGROUND OF THE INVENTION

This invention relates generally to a screw anchor or retainer member and more particularly to a novel one-piece molded elastomeric edge connector retainer member that is readily elastically pressed into a panel edge cut-out and locked therein.

Many work structures include a generally horizontal apertured plate-like workpiece that is designed to be secured by a screw element to a mating edge of a vertically disposed apertured panel by means of an anchor member. The U.S. Pat. Nos. 2,873,496 to Elms; 3,084,211 to Rapata; and 3,425,725 to Givot et al. are examples of prior art edge connector assemblies.

BRIEF DESCRIPTION OF THE INVENTION

According to the present invention a novel one-piece plastic screw anchor or retainer member is provided which is resiliently collapsed by the user's fingers for ready insertion in a panel edge cut-out. Upon its release the retainer snaps back to its original shape locking the retainer in the cut-out with its central bore adapted for receiving a screw element. The retainer central bore comprises opposed arcuate wall segments interrupted by living hinge gaps defining, with integral bridging portions, a pair of opposed living hinges. One living hinge is formed by a arcuate web portion bridging its associated gap while the other gap is bridged by a wedge-shaped portion comprising tapered leg segments terminating in a lead-in nose portion.

The retainer is sized for insertion of the wedge-shaped portion in a panel edge cut-out defined by intersecting vertically and horizontally extending slot portions. The vertically extending slot portion has an upper open end interrupting the panel upper mating edge. The horizontally extending slot portion portion defines an upper pair of stop edge segments together with a pair of vertically extending opposed side edges spaced horizontally a predetermined distance. Upon the retainer body portion being flexed inwardly about its opposed living hinges the arcuate bore segments assume an oblong or oval shape. This narrowing of the body portion allows cam shoulders formed by the tapered leg segments to pass through the cut-out horizontal slotted portion until flange sections of the channel portion contact one side of the panel.

Release of pressure on the retainer body portion causes the arcuate wall segments to resume their normal shape As a consequence the cam shoulders contact the opposite side of the panel fixing the retainer in the cut-out with the principal axis of the retainer central bore aligned with the horizontally extending slot major axis. The central bore is adapted to threadably receive a screw element extending through an aperture in a horizontal plate-like workpiece for securing it to the panel mating edge. As the screw is turned it draws the retainer body portion upper surface against the cut-out stop edge segments thereby tightly securing the workpiece to the panel upper mating edge.

A further feature of the invention is that with the screw element threaded in the body portion bore arcuate segments the cam shoulders cannot be forced toward each other thus mechanically locking the retainer in the panel cut-out.

Still another feature of the invention is that the arcuate segments defining of the retainer body portion central bore may, by either formed with smooth opposed surfaces sized to receive a self-tapping screw element or formed with screw element internal mating threads.

BRIEF DESCRIPTION OF THE DRAWINGS

Other features and advantages of the present invention will become apparent from the following description and the accompanying drawings wherein.

DESCRIPTION OF THE PREFERRED EMBODIMENT

Figure 1:
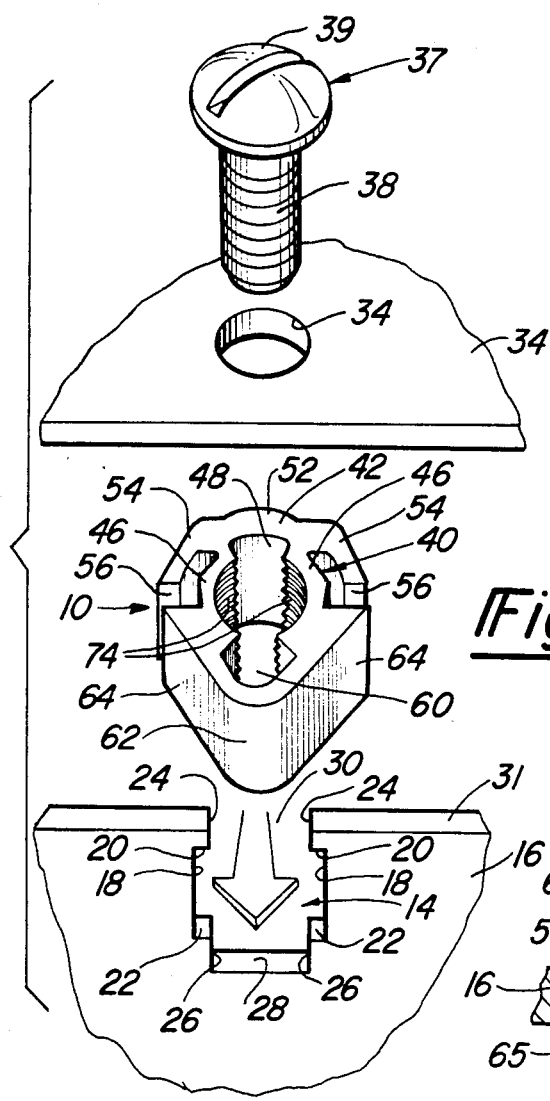
FIG. 1 is a perspective view showing a fastening device incorporating the features of the present invention in position to be assembled with an apertured workpiece.
Figure 2:
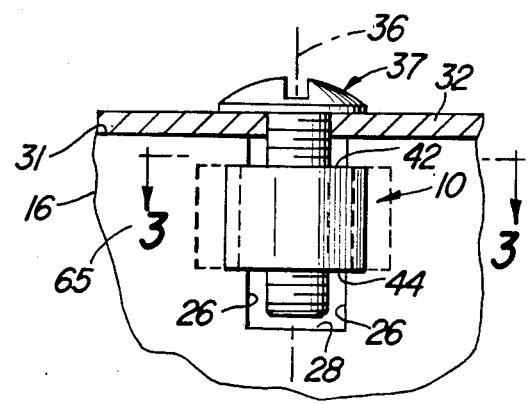
FIG. 2 is a sectional view showing the FIG. 1 fastening device assembled with the workpiece.
Figure 3:
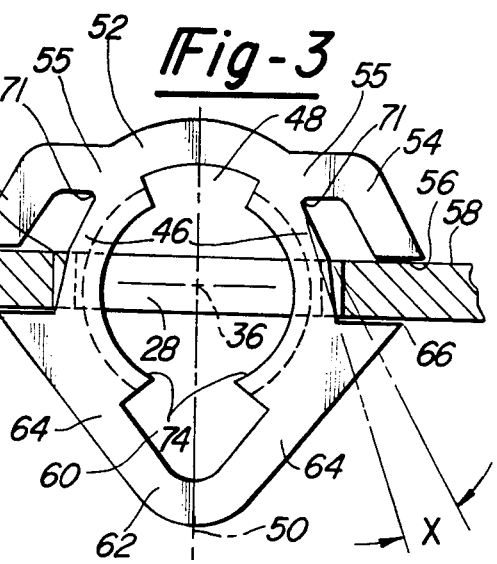
FIG. 3 is a horizontal sectional view taken on the line 3—3 of FIG. 2, with the screw element removed.

Referring now more specifically to the drawings an anchor member or retainer generally indicated at 10, is shown in FIGS. 1–3. The retainer 10 is preferably made from a molded one-piece flexible plastic material, but, if desired, other various elastomeric materials could be used.

The retainer 10 is adapted to be inserted into a cut-out 14, formed by intersecting horizontally and vertically extending slotted portions, in a workpiece or panel 16 shown vertically disposed for the purposes of the present description. The horizontal slotted portion is defined by a pair of laterally spaced vertically extending side edges 18 and vertically spaced horizontally extending upper 20 and lower 22 stop edge segments, respectively. The vertical slot portion is defined by an upper 24 and a lower 26 pair of laterally spaced vertically extending side segments. The vertical slot portion is closed at the bottom by horizontally extending bottom edge 28 and open at the top, indicated by space 30, so as to interrupt upper mating edge 31 of the panel 16.

The retainer 10 is designed for use in securing an apertured upper plate-like member or workpiece 32 to the mating edge 31 of the panel 16. The plate-like member 32 has an aperture 34 with its principal axis adapted to be aligned on the vertical major axis of the cut-out vertical slotted portion 14, indicated at 36 in FIGS. 2 and 3. A screw element generally indicated at 37 in FIG. 1, includes a threaded shank 38 and a slotted head 39. It will be noted that although a machine type bolt is shown at 37 other forms of threaded fasteners, such a self-tapping screws may be used in the present invention as explained below in FIG. 5.

As seen in FIGS. 1, 2 and 3, the retainer 10 includes an elongated hollow tubular body portion 40 having upper 42 and lower 44 end faces. The body portion 40 includes a central through bore having its principal axis adapted to be aligned on the axis 36 of the cut-out vertical slotted portion. The tubular body through bore is defined by arcuate wall segments 46 each subtending a central angle of about 125 degrees. The bore arcuate wall segments 46 as shown molded with internal threads for receiving the screw element 37. The arcuate wall segments. 46 and 47 are interrupted by diametrically opposed axially extending first and second living-hinges allowing the retainer body portion opposed arcuate wall segments to be resiliently collapsed inwardly as seen in FIG. 4.

The first living hinge is defined by an arcuate living-hinge bridged gap 48 disposed symmetrically about the transverse vertically extending plane of symmetry indicated by construction line 50 in FIG. 3. The living-hinge bridged gap 48 is bridged or closed by an outwardly bowed arcuate web segment 52. A pair of generally L-sectioned angled locking flanged segments 54 are shown extending inwardly from its juncture 55 with each end of the web segment 52. As seen in FIG. 3 each flanged segment 54 has a free edge 56 adapted to engage or contact its associated one side 58 of the panel 16 with the retainer arcuate wall segments 46 inserted in the panel cut-out 14. The reduced thickness of the living hinge arcuate web bridging segment 52 enables the retainer 10 to be readily flexed inwardly about the transverse plane 50. It will be noted that the first living hinge arcuate gap 48 subtends an arc of about 55 degrees from central bore axis 36 in the preferred form of the invention.

The second living hinge is defined by a generally triangular-shaped living-hinge gap 60 symmetrically disposed about the transverse plane 50. The living-hinge gap 60 is bridged or closed by a wedge-shaped bridging portion including radiused or rounded lead-in nose segment 62 together with a pair of integral outwardly diverging cam or tapered leg segments 64. Each of the leg segments 64 extending outwardly at an acute angle of about 40 degrees from the transverse plane 50 toward the panel other side 65. The tapered leg segments 64 facilitate the retainer's entrance in the cut-out horizontal slot portion. It will be noted that the tapered legs 64 join the body portion arcuate segments at offset junctures by outer cam shoulder 66 lying in a plane parallel with opposed flanged segment free edges 56.

Figure 4:
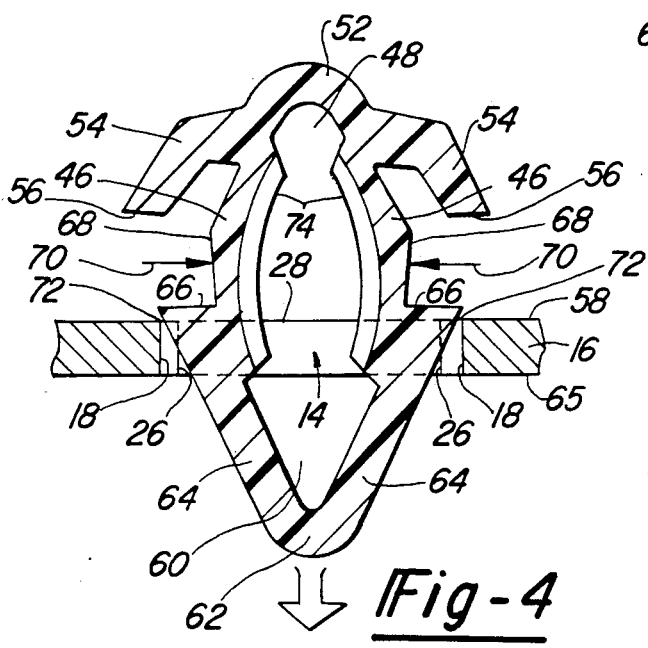
FIG. 4 is a view similar to FIG. 3 showing the retainer being inserted into the panel cut-out.

To insert the retainer 10 in the panel cut-out 14 the installer grasps the body portion 40 at its planar side faces 68, shown in FIG. 4, and applies compression pressure in the direction of arrows 70. This causes the normally circular shaped pair of arcuate wall segments 46 and 47 to flex about the pair of first and second diametrically opposed living hinges thus assuming the elongated shape of FIG. 4. It will be noted that the arcuate segment living hinge 52 pivots about flexure interior corner "score" lines 71 adjacent the junctures 55 of the web segment 52 with the arcuate wall segments 46. Thus, a deflection angle "X" is provided which insures positive retention of the retainer 10 in the cut out. In the form shown the deflection angle "X" is of the order of 10 degrees.

The elongated shape allows the tapered leg segments 64 to contact the cut-out horizontally extending slotted portion corners 72. In so doing, the tapered leg segments 64 are cammed toward each other enabling the cam shoulders 66 to pass through the cut-out 14. Upon the cam segments 64 compressing the arcuate wall segments 46 toward each other the shoulders 66 pass through the horizontal slotted portion of the cut-out after which the retainer 10 is free to flexibly return to its normal shape. Release of pressure on the retainer is signalled to the installer when the flange section free edges 56 contact the panel one side 58. With the cam shoulders 66 positioned in contact with the panel other side 65 the retainer 10 is fixed against transverse movement.

It will be noted in FIG. 2 that the vertical extent of the retainer between its upper 42 and lower 44 faces is a predetermined distance. The distance is substantially equal to but slightly less than the distance between the opposed pairs of upper 20 and lower 22 stop edge segments of the cut-out horizontal slotted portion. Thus, the retainer is also fixed in the cut-out against vertical movement relative to the panel 16.

The plate-like workpiece 32 may now be secured to the panel 16 by positioning the workpiece on the panel upper mating edge 31, as shown in FIG. 2, with the aperture 34 aligned with the vertical axis 36. The screw element elongated threaded shank 38 is inserted through the aperture 34 and threaded onto the bore internal mating threads 74 formed on the arcuate wall segments 46 and 47. Upon being tightened the screw element draws the retainer upper face 42 into pressure contact with the upper edge segments 20 thus retaining the workpieces 16 and 32 in eight assembled relationships.

It will be noted in FIG. 2 that the cut-out vertical slotted portion is shown extending downwardly past the horizontal slotted portion providing a lower open area defined by vertical edge portions 26. This additional open area is sized to receive the screw shank 38 upon tightening the screw element 37. As a result, the cut-out 14 is shown defining a cross-shaped opening. It will be appreciated, however, that the cut-out may be formed with an inverted T-shaped configuration, i.e., eliminating the cut-out area defined by the vertical edge portions 26, to receive other types and sizes of fasteners without departing from the scope of the invention.

Figure 5:
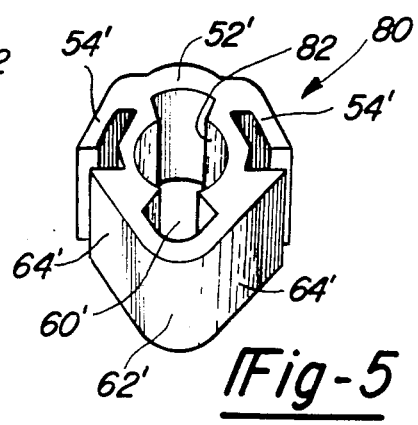
FIG. 5 is a perspective view of an alternative form of retainer.

In this respect, FIG. 5 shows a modified form of the invention wherein an anchor member or retainer is indicated at 80 wherein its bore arcuate wall segments 46 interior surfaces 82 are formed smooth. Thus, the interior surfaces 82 define a predetermined undersized bore diameter adapted to form its own internal threads upon receiving a self-tapping screw element therein.

Although only two embodiments of the invention have been disclosed and described, it is apparent that other embodiments and modifications are possible within the scope of the appended claims.

What is claimed is:

1. A one-piece anchor member of a molded flexible material for use in securing a generally horizontally disposed workpiece to an upper mating edge of a vertically disposed panel, said panel mating edge interrupted by a cut-out defined by horizontally and vertically extending rectangular-shaped intersecting slotted portions, said cut-out arranged in mirror image fashion about a vertically extending transverse plane of symmetry intersecting said panel at right angles, said horizontally extending slotted portion defining an upper pair of stop edge sections, together with a pair of vertically extending opposed side edges spaced apart a predetermined horizontal distance, said anchor member comprising:

an elongated tubular-like body in the form of a pair of opposed arcuate wall segments defining a central through bore, said body portion adapted for insertion in said cut-out horizontally extending slotted portion with the principal axis of said bore aligned with the major axis of said cut-out vertically extending slotted portion;

said body arcuate wall segments having upper and lower end faces and integrally joined by diametrically opposed first and second living-hinges in the form of bridged gaps symmetrically disposed about said tranverse plane;

said first living hinge bridged gap defined by an arcuate web portion radially offset outwardly from said bore, said arcuate web portion joined to said arcuate wall segments at either side of said first gap at integral flanged segment junctures, angled flange segments extending from each said flanged juncture toward one side of said panel, each said flanged segment having an inner free edge for location juxtaposed said panel one side;

said second living hinge bridged gap defined by a wedged shaped portion offset outwardly from said bore, said wedged shaped portion having a pair of tapered legs terminating in a lead-in nose, said tapered legs tangentially joined to said arcuate wall segments on either side of said second gap by integral outwardly offset junctures defining a pair of cam shoulders;

wherein upon said anchor body portion being flexed inwardly about said first and second living hinges, said central bore assumes an oblong shape about said transverse plane allowing said cam shoulders to pass through said cut-out horizontally slotted portion until each said flanged segment inner edge contacts said panel one side, whereby upon release of pressure on said body portion said arcuate wall segments assume their normal shape and said pair of cam shoulders contact the opposite side of said panel fixing said anchor in said cut-out, and whereby upon a threaded element being inserted through the workpiece aperture and threaded in said bore securing the workpiece to the panel mating edge and wherein insertion of said threaded element in said bore prevents said cam shoulders from being pressed toward each other thereby mechanically locking said anchor member in the panel cut-out.

2. The one-piece anchor member as set forth in claim 1, wherein said bore arcuate wall segments interior surfaces are formed with interior threads adapted to threadably receive an externally threaded shank portion of the threaded element.

3. The one-piece anchor member as set forth in claim 1, wherein said bore arcuate wall segments interior surfaces are formed smooth adapted to receive a self-tapping threaded element.

4. The one-piece anchor member as set forth in claim 1, wherein the panel cut-out defines a cross-shaped opening.

5. The one-piece anchor member as set forth in claim 1, wherein the panel cut-out has an inverted T-shaped configuration.

6. The one-piece anchor member as set forth in claim 1, wherein each angled flange segment has a generally L-sectioned configuration.

* * * * *